United States Patent [19]

Chang et al.

[11] Patent Number: 5,748,761
[45] Date of Patent: May 5, 1998

[54] METHOD FOR SEGMENTING AND ESTIMATING A MOVING OBJECT MOTION

[75] Inventors: Gyu-Hwan Chang; Hae-Mook Jung, both of Seoul; Seong-Dae Kim, Daejeon; Jae-Gark Choi, Deajeon; Si-Woong Lee, Deajeon, all of Rep. of Korea

[73] Assignee: Daewoo Electronics Co., Ltd., Seoul, Rep. of Korea

[21] Appl. No.: 502,229

[22] Filed: Jul. 13, 1995

[30] Foreign Application Priority Data

Apr. 8, 1995 [KR] Rep. of Korea ............... 95-8177

[51] Int. Cl.$^6$ ................................................. G06T 7/20
[52] U.S. Cl. ................. 382/107; 382/236; 348/416
[58] Field of Search ............................. 382/236, 107, 382/173; 348/402, 407, 413, 416

[56] References Cited

U.S. PATENT DOCUMENTS

| 5,555,033 | 9/1996 | Bazzaz | 348/699 |
| 5,557,684 | 9/1996 | Wang et al. | 382/107 |
| 5,572,258 | 11/1996 | Yokoyama | 348/415 |

OTHER PUBLICATIONS

Jain et al. "Displacement Measurement and Its Application in Interfralue Image Coding." IEEE Transactions on Communications, vol. COM-29, No. 12, pp. 1799-1806, Dec. 1981.

Adiv. "Determining Three-Dimensional Motion and Structure from Optical Flow Generated by Several Moving Objects." IEEE Trans. Pattern Analysis and Machine Intelligence, vol. PAM-7, No. 4, pp. 384-401, Jul. 1985.

Hötter et al. "Image Segmentation Based on Object Oriented Mapping Parameter Estimation." Signal Processing 15, pp. 315-334, 1988.

Gonzalez et al. *Digital Image Processing*. Addison-Wesley Publishing Co., pp. 458-461, 1992.

Gambotto. "A Region-Based Spatio-Temporal Segmentation Algorithm." Proceedings 11th IAPR Int. Conf. on Pattern Recognition, vol. IV, pp. 189-192, Sep. 1992.

"A Multiresolution Model-Based Segmentation Algorithm for 3-D Motion and Structure Estimation." Proceedings 1994 IEEE Region 10's 9th Annual Inf. Conf.. vol. 2, pp. 862-866, Aug. 1994.

Choi et al. "Segmentation and Motion Estimation of Moving Objects for Objec-Oriented Analysis-Synthesis Coding." 1995 Int. Conf. on Acoustics, Speech, and Signal Processing, vol. 4, pp. 2431-2434, May 1995.

*Primary Examiner*—Michael T. Razavi
*Assistant Examiner*—Jon Chang
*Attorney, Agent, or Firm*—Anderson, Kill & Olick, P.C.

[57] ABSTRACT

A method for use in an object-oriented analysis-synthesis coder, for segmenting an image of a current frame into moving objects and describing each motion of the moving objects with a set of motion parameters, which comprises the steps of: (a) comparing the current frame with a preceding frame to detect a motion vector field; (b) sliding window blocks on the motion vector field, and computing the degree of homogeneity for each of the window blocks to produce a seed block; (c) determining a set of initial values for the set of motion parameters based on the seed block; (d) evaluating whether each motion vector contained in and around the seed block is describable with the set of initial values or not, to thereby detect a revised region; (e) determining a set of revised values for the set of motion parameters from the revised region; (f) evaluating whether each motion vector contained in and around the revised region is describable with the set of revised values or not, to thereby detect a newly revised region; and (g) repeating the steps (e) and (f) until the difference between a current revised region and a previous revised region is less than a predetermined value, to thereby determine a set of final values for the set of motion parameters.

4 Claims, 2 Drawing Sheets

METHOD FOR SEGMENTING AND ESTIMATING A MOVING OBJECT MOTION

FIELD OF THE INVENTION

The present invention relates to an objected-oriented analysis-synthesis coding technique for encoding image signals; and, more particularly, to a method for segmenting an image according to moving objects therein and estimating each motion of the moving objects.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is inevitable to compress or reduce the volume of data through the use of a data compression technique, especially in the case of such low bit-rate video signal encoder as video-telephone or teleconference system.

One of such methods for encoding video signals for a low bit-rate encoding system is the so-called object-oriented analysis-synthesis coding technique, wherein an input video image containing moving objects therein is divided according to the moving objects; and each object is described by three sets of parameters defining the motion, contour(or shape) and pixel data of the object.

In order to achieve the primary goal of the object-oriented analysis-synthesis coding technique, i.e., the task of exactly dividing the input video image into the moving objects and precisely estimating each motion of the moving objects, there have been proposed several approaches. One of them is a hierarchically structured segmentation technique(see Michael Hotter et al., "Image Segmentation Based on Object Oriented Mapping Parameter Estimation", *Signal Processing*, 15, No. 3, pp 315-334(October 1988)).

According to the hierarchically structured segmentation technique, an area of the input video image to be segmented is defined by a set of uniform motion and position parameters denoted as mapping parameters. For instance, eight parameters are used to describe an arbitrary three-dimensional motion of a planar rigid object. In a first step, a change detector distinguishes between temporally changed and unchanged regions of two successive fields. Each changed image region is interpreted as one object. The motion and position of each object is described by one set of mapping parameters. Based on the mapping parameters and the information on a temporally preceding field, reconstruction of a temporally ensuing field can be achieved. In a next step of hierarchy, those regions of the image, which are not correctly described in their mapping, are again detected by the change detector and treated according to the changed parts detected at the first step of hierarchy. However, in this technique, if a large number of moving objects is included within one changed area, it may be difficult to properly segment them.

SUMMARY OF THE INVENTION

It is, therefore, a primary object of the invention to provide an improved method for exactly segmenting an image according to the moving objects therein and precisely estimating each motion of the moving objects.

In accordance with the invention, there is provided a method, for use in an object-oriented analysis-synthesis coder, for segmenting an image of a current frame into moving objects and describing each motion of the moving objects with a set of motion parameters, which comprises the steps of:

(a) comparing the current frame with a preceding frame to detect a moving area in the current frame;

(b) further comparing the current frame with the preceding frame to detect a motion vector for each pixel in the moving area, to thereby produce a motion vector field;

(c) sliding window blocks of an N×N pixel size on the motion vector field, N being a positive integer, and computing the degree of homogeneity for each of the window blocks to select a most homogeneous window block as seed block;

(d) determining a set of initial values for the set of motion parameters based on the seed block;

(e) evaluating whether each motion vector contained in and around the seed block is describable with the set of initial values or not, to thereby detect a revised region defined by motion vectors described with the set of initial values;

(f) determining a set of revised values for the set of motion parameters from the revised region;

(g) evaluating whether each motion vector contained in and around the revised region is describable with the set of revised values or not, to thereby detect a newly revised region defined by motion vectors described with the set of revised values;

(h) repeating the steps (f) and (g) until the difference between a current revised region and a previous revised region is less than a predetermined value, to thereby determine a set of final values for the set of motion parameters; and (i) repeating the steps (c) to (h) until each set of motion parameters for each of the moving objects is determined.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
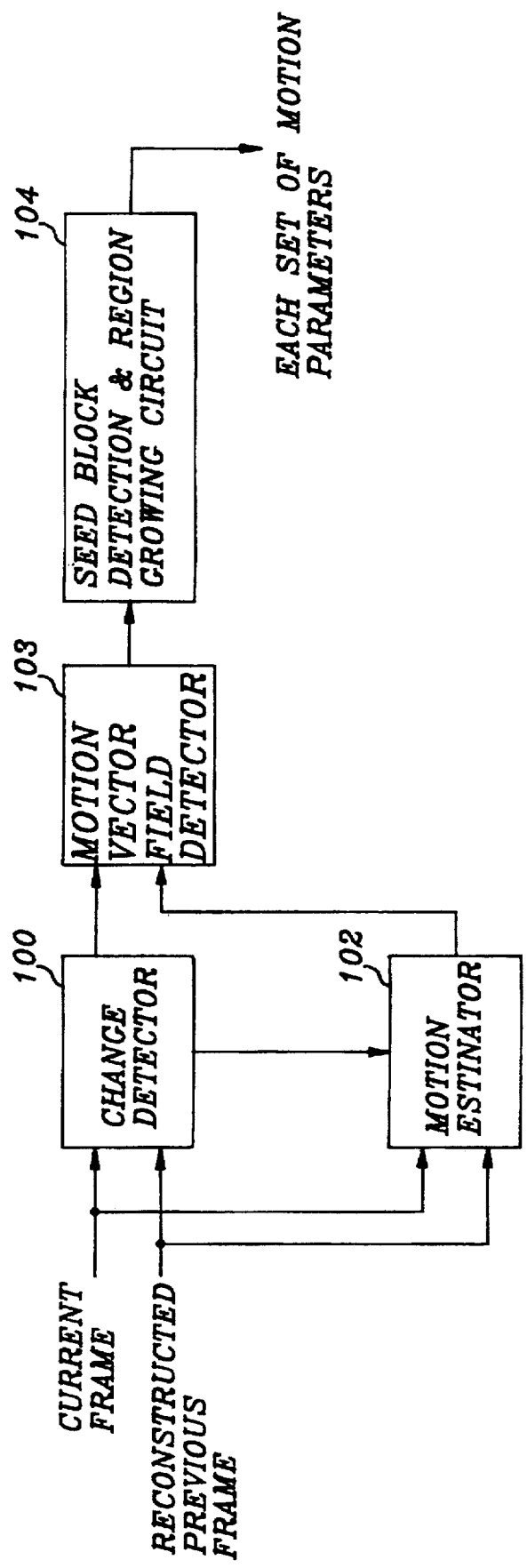
FIG. 1 is a block diagram of segmenting an image into moving objects and describing each motion of the moving objects with a set of motion parameters in accordance with the present invention.

FIG. 1 describes a block diagram of segmenting moving objects and describing each motion of the moving objects with a set of motion parameters in accordance with the present invention.

As shown in FIG. 1, two input signals, i.e., a current frame signal and a reconstructed previous frame signal are fed to a change detector 100 and a motion estimator 102, respectively.

The change detector 100 compares the current frame signal with the reconstructed previous frame signal to detect a changed area from the background in the current frame. The detected changed area information is sent to the motion estimator 102 and a motion vector field detector 103.

The motion estimator 102 detects motion vectors for a set of selected pixels, i.e., feature points, in the changed area, wherein each of the feature points is a pixel capable of representing its neighboring pixels. That is, a number of feature points are first selected from all of the pixels contained in the changed area. Then, motion vectors for each of the selected feature points are determined by forming a block of a predetermined size at each of the selected feature points and by using a block matching algorithm(see, e.g., J. R. Jain et al., "Displacement Measurement and Its Application in Interframe Image Coding", *IEEE Transactions on Communications*, COM-29, No. 12 pp 1799–1808 (December 1981)), wherein each of the motion vectors represents a spatial displacement between one feature point in the current frame and a corresponding matching point, i.e., a most similar pixel, in the reconstructed previous frame.

The motion vector field detector 103 determines motion vectors for non-feature points in the changed area by averaging the motion vectors for the feature points, to thereby detect motion vectors for all of the pixels in the changed area. The changed area defined by motion vectors for all of the pixels therein is called a motion vector field. The information on the motion vector field is sent to a seed block detection and region growing circuit 104.

The seed block detection and region growing circuit 104 segments the motion vector field into moving objects and describes each motion of the moving objects with a set of motion parameters. In accordance with the present invention, in order to describe each motion of the moving objects, there is employed an 8-parameter motion model (see, e.g., Gilad Adiv, "Determining Three-Dimensional Motion and Structure from Optical Flow Generated by Several Moving Objects", *IEEE Transactions on Pattern Analysis and Machine Intelligence*, PAMI-7, No. 4, pp 384–401(July 1985)), which may be represented as follows:

$$V_x(x,y) = a_1 + a_2 x + a_3 y + a_7 x^2 + a_8 xy \quad \text{Eq. (1)}$$

$$V_y(x,y) = a_4 + a_5 x + a_6 y + a_7 xy + a_8 y^2 \quad \text{Eq. (2)}$$

wherein $V_x(x,y)$ is the horizontal component of a motion vector at a position (x,y) and $V_y(x,y)$ is the vertical component of the motion vector at the position (x,y).

Figure 2:
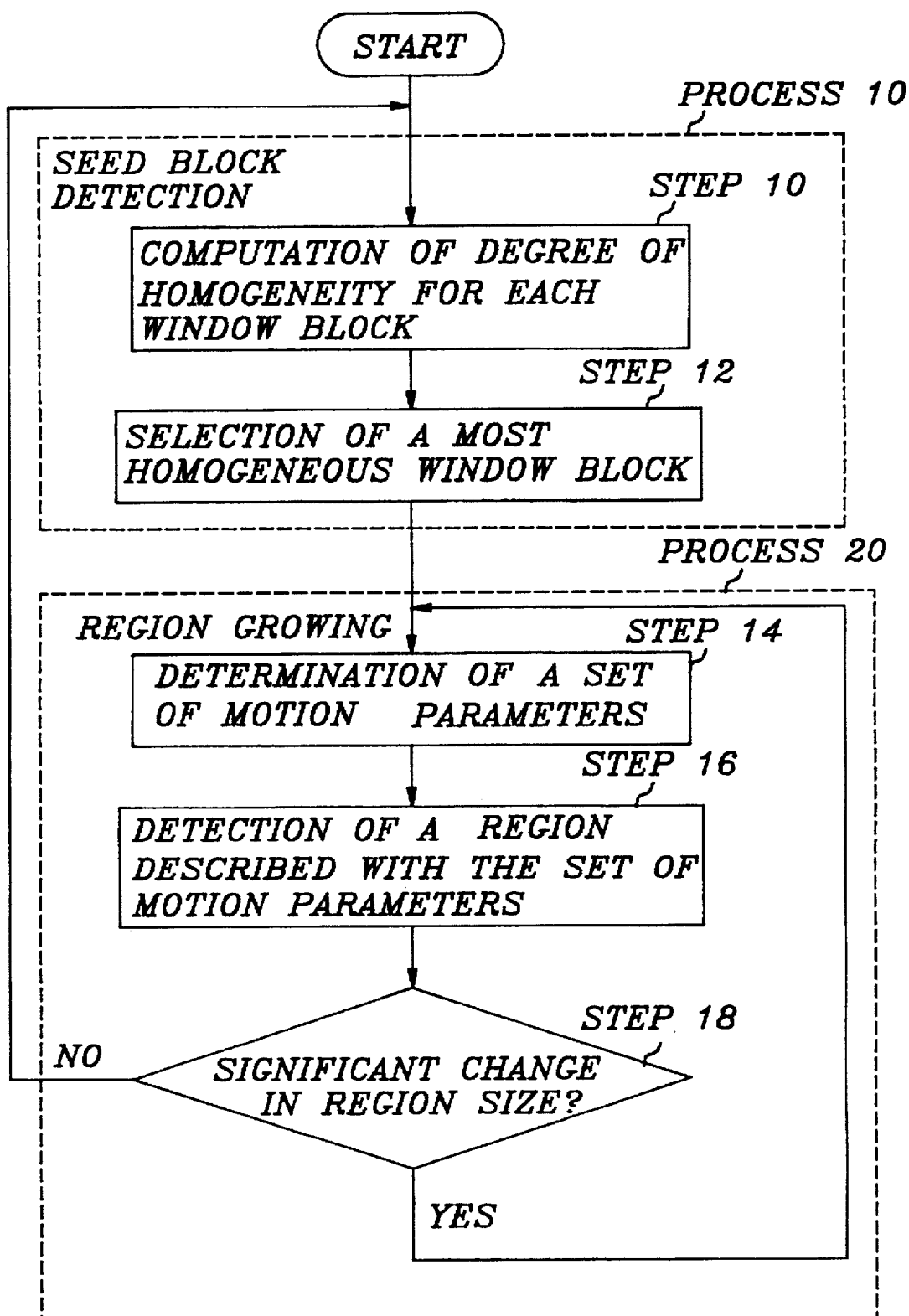
FIG. 2 shows a flow chart illustrating an operational flow of the seed block detection and region growing circuit shown in FIG. 1.

Referring to FIG. 2, the eight motion parameters for each of the moving objects in the motion vector field are determined through two processes: a seed block detection process 10 and a region growing process 20.

The seed block detection process 10 detects a seed block in order to determine a set of initial values for the eight motion parameters, and the region growing process 20 increases the size of the seed block through the use of an iterative region growing algorithm, to thereby estimate a set of actual values for the eight motion parameters.

In the seed block detection process 10, there are two steps 10 and 12. In the step 10, a W×W pixel size of window block slides on the motion vector field; and the degree of homogeneity for each position of the window block is computed. Thereafter, in the step 12, a most homogeneous window block is selected as a seed block. The degree of homogeneity may be determined as follows:

$$D(m,n) = \frac{1}{E(a^*_1, \ldots, a^*_8)} \quad \text{Eq. (3)}$$

$$E(a_1, \ldots, a_8) = \sum_{X=m}^{m+W-1} \sum_{y=n}^{n+W-1} \epsilon(x,y;a_1,\ldots,a_8) \quad \text{Eq. (4)}$$

$$\epsilon(x,y;a_1,\ldots,a_8) = (V_x(x,y) - \hat{V}_x(x,y))^2 + (V_y(x,y) - \hat{V}_y(x,y))^2 \quad \text{Eq. (5)}$$

$$\hat{V}_x(x,y) = a_1 + a_2 x + a_3 y + a_7 x^2 + a_8 xy \quad \text{Eq. (6)}$$

$$\hat{V}_y(x,y) = a_4 + a_5 x + a_6 y + a_7 xy + a_8 y^2 \quad \text{Eq. (7)}$$

wherein D(m,n) represents the degree of homogeneity at a window position (m,n), W is a window size and $\{a_1^*, a_2^*, \ldots, a_8^*\}$ is an optimal set of motion parameters for a window block. The optimal set of motion parameters is a solution for a set of eight equations, each of which is derived by taking partial derivatives of Eq. (4) with respect to $a_1, a_2, \ldots, a_8$ and equating them to 0. As shown in Eqs. (3) to (7), the degree of homogeneity for a window block is determined through the use of an error function between a given set of motion vectors in a window block and an estimated set of motion vectors obtained from the optimal set of motion parameters.

After detecting the seed block, the process 20 begins to determine a set of initial values for a set of motion parameters. And then, in order to correct the initial values to an actual set of motion parameters, a convergence process is taken through the use of a region growing technique described below.

In step 14, a set of initial values for a set of motion parameters is determined based on the seed block detected in step 12 or a set of revised values for the set of motion parameters is determined based on a revised region detected in step 16 below.

The set of initial values for the set of motion parameters are determined by fetching the optimal set of motion parameters for the seed block. And, the set of revised values for the set of motion parameters is determined based on all of the motion vectors contained in the revised region as in the case of detecting the optimal set of motion vectors for the seed block.

In step 16, in order to correct the initial values or the revised values to an actual set of motion parameters, a region growing process is carried out by evaluating whether each motion vector contained in and around the seed block or the revised region is capable of being described or not with the initial values or the revised values, to thereby detect the revised region or define a newly revised region.

In step 18, the difference between a current revised region and a previous revised region is compared with a predetermined value, to decide whether a region growing iteration is to be continued. The region growing iteration is repeated until the difference between the current revised region and the previous revised region is less than the predetermined value, to thereby determine a set of final values for the set of motion parameters.

After detecting the final values for the set of motion parameters, another set of motion parameters is detected by repeating the steps 10 to 18 until each set of motion parameters for each of the moving objects is determined.

While the present invention has been shown and described with respect to the particular embodiments, it will be apparent to those skilled in the art that many changes and modifications may be made without departing from the spirit and scope of the invention as defined in the appended claims.

What is claimed is:

1. A method, for use in an object-oriented analysis-synthesis coder, for segmenting an image, said image containing moving objects, of a current frame into the moving objects therein and describing each motion of the moving objects with a set of motion parameters, said method comprising the steps of:

(a) detecting a moving area having at least one pixel in the current frame by comparing the current frame with a preceding frame;

(b) detecting a motion vector for each pixel in the moving area by comparing the current frame with the preceding frame to generate a motion vector field;

(c) sliding window blocks on the motion vector field and computing the degree of homogeneity for each of the window blocks to select a most homogeneous window block as a seed block, wherein the degree of homogeneity for a window block is computed in accordance with an error function between a given set of motion vectors in the window block and an estimated set of motion vectors obtained from an optimal set of motion parameters for the window block;

(d) determining the optimal set of motion parameters for the seed block to provide a set of initial values;

(e) determining a revised region by a region growing process in the motion vector field, wherein the region growing process evaluates whether each motion vector contained in and around the seed block is describable with the set of initial values;

(f) determining a set of revised values for the set of motion parameters from the revised region;

(g) determining a newly revised region by the region growing process in the motion vector field, wherein the region growing process evaluates whether each motion vector contained in and around the revised region is describable with the set of revised values;

(h) repeating the steps (f) and (g) using the newly revised region until the difference between a current revised region and a previous revised region is less than a predetermined value, to thereby determine a set of final values for the set of motion parameters; and (i) repeating the steps (c) to (h) to determine a set of motion parameters for each of the moving objects.

2. The method of claim 1, wherein the degree of homogeneity represented as:

$$D(m,n) = \frac{1}{E(a^*_1, \ldots, a^*_8)};$$

where, $$E(a_1, \ldots, a_8) = \sum_{x=m}^{m+W-1} \sum_{y=n}^{n+W-1} \epsilon(x,y;a_1, \ldots, a_8);$$

$$\epsilon(x,y;a_1, \ldots, a_8) = (V_x(x,y) - \hat{V}_x(x,y))^2 + (V_y(x,y) - \hat{V}_y(x,y))^2;$$

$$\hat{V}_x(x,y) = a_1 + a_2 x + a_3 y + a_7 x^2 + a_8 xy;$$

and $$\hat{V}_y(x,y) = a_4 + a_5 x + a_6 y + a_7 xy + a_8 y^2,$$

wherein D(m,n) represents the degree of homogeneity at a window position (m,n); W represents the window size; and {$a_1^*, a_2^*, \ldots, a_8^*$} is the optimal set of motion parameters for the window block; $V_x(x,y)$ is a horizontal component of a motion vector at a position (x,y); $V_y(x,y)$ is a vertical component of the motion vector at the position (x,y); and Vx(x,y) and Vy(x,y) are the horizontal and the vertical components of a motion vector derived from the optimal set of motion parameters.

3. Apparatus for use in an object-oriented analysis-synthesis coder, for segmenting an image, said image containing moving objects, of a current frame into the moving objects therein and describing each motion of the moving objects with a set of motion parameters, comprising:

a change detector for detecting a moving area having at least one pixel in the current frame by comparing the current frame with a preceding frame;

a motion estimators for detecting a motion vector for each pixel in the moving area by further comparing the current frame with the preceding frame to generate a motion vector field;

a seed block detector for sliding window blocks on the motion vector field and computing a degree of homogeneity for each of the window blocks to select a most homogeneous window block as a seed block, wherein the degree of homogeneity for a window block is computed in accordance with an error function between a given set of motion vectors in the window block and an estimated set of motion vectors obtained from the optimal set of motion parameters for the window block;

a determining device for determining the optimal set of motion parameters for the seed block to provide a set of initial values;

a region growth processor for determining values for a set of motion parameters of a moving object in accordance with a region growing process and the seed block in the motion vector field, wherein the region growth processor includes:

an evaluator for evaluating whether each motion vector contained in and around the seed block is describable with the set of initial values a revised region;

wherein the determining device is operable to determine a set of revised values for the set of motion parameters from the revised region; and wherein the evaluator is operable to evaluate whether each motion vector contained in and around the revised region is describable with the set of revised values to determine a newly revised region and to provide the set of revised values as the final values when the difference between a current revised region and a previous revised region is less than a predetermined value.

4. The apparatus of claim 3, wherein the degree of homogeneity represented as:

$$D(m,n) = \frac{1}{E(a^*_1, \ldots, a^*_8)};$$

where, $$E(a_1, \ldots, a_8) = \sum_{x=m}^{m+W-1} \sum_{y=n}^{n+W-1} \epsilon(x,y;a_1, \ldots, a_8);$$

$$\epsilon(x,y;a_1, \ldots, a_8) = (V_x(x,y) - \hat{V}_x(x,y))^2 + (V_y(x,y) - \hat{V}_y(x,y))^2;$$

$$\hat{V}_x(x,y) = a_1 + a_2 x + a_3 y + a_7 x^2 + a_8 xy;$$

and $$\hat{V}_y(x,y)=a_4+a_5x+a_6y+a_7xy+a_8y^2,$$

wherein $D(m,n)$ represents the degree of homogeneity at a window position $(m,n)$; W represents the window size; and $\{a_1^*, a_2^*, \ldots, a_8^*\}$ is the optimal set of motion parameters for the window block; $V_x(x,y)$ is a horizontal component of a motion vector at a position $(x,y)$; $V_y(x,y)$ is a vertical component of the motion vector at the position $(x,y)$; and $Vx(x,y)$ and $Vy(x,y)$ are a horizontal and a vertical components of a motion vector derived from the optimal set of motion parameters.

* * * * *